United States Patent [19]

Wallace et al.

[11] Patent Number: 5,720,884
[45] Date of Patent: Feb. 24, 1998

[54] METHOD FOR AUTOMATIC CONTROL OF CORROSION IN A WATER DISTRIBUTION SYSTEM

[75] Inventors: David E. Wallace, Sun Prairie, Wis.; Stephen G. Kellett, Chesterfield, Mo.

[73] Assignee: MG Industries, Malvern, Pa.

[21] Appl. No.: 671,020

[22] Filed: Jun. 25, 1996

[51] Int. Cl.$^6$ .................................................... C02F 5/08
[52] U.S. Cl. ................... 210/696; 210/742; 210/743; 364/500; 422/3; 422/14
[58] Field of Search ..................... 210/696–701, 210/739, 742, 743; 364/500, 496; 422/14–19, 3

[56] References Cited

U.S. PATENT DOCUMENTS

| | | | |
|---|---|---|---|
| 4,830,757 | 5/1989 | Lynch et al. | 210/743 |
| 4,931,187 | 6/1990 | Derham et al. | 210/743 |
| 5,057,229 | 10/1991 | Schulenburg | 210/696 |
| 5,294,916 | 3/1994 | Bolton et al. | 210/696 |
| 5,391,302 | 2/1995 | Funahashi et al. | 210/696 |

OTHER PUBLICATIONS

Article "An Update of the Federal Regs", F. Pontius, *Journal of the American Water Works Association*, Mar. '96, pp. 36–46.

Article "Alkalinity, pH, & Copper", Edwards et al, *Journal of the American Water Works Association*, Mar. '96, pp. 81–94.

Publication entitled "Pump–Colorimeter Analyzers", of the Hach Company (undated).

Article "Determine Saturation and Stability Indexes Graphically", Yi–Shon Chen, Stone & Webster Engineering Corp.

Excerpts from publication of *American Water Works Association Research Foundation*, entitled "Lead Control Strategies", 1990.

EPA Lead and Copper Rule Guidance Manual, vol. II: Corrosion Control Treatment, Sep. 1992.

Primary Examiner—Peter A. Hruskoci
Attorney, Agent, or Firm—William H. Eilberg

[57] ABSTRACT

A water distribution system facilitates automatic corrosion control. The operator enters a set of values of parameters associated with water in the system. The system automatically and repeatedly measures the temperature and pH of the water. The system then computes a target pH for the water, according to a function which depends on the temperature and the other parameters, and on an index of corrosion. The system then varies the pH of the water, so as to minimize the deviation between the measured pH and the target pH. The system performs this process repeatedly, to maintain the desired properties of the water. In particular, the operator can easily and automatically control the water so as to make it either more corrosive or more scale-forming, in such a manner as to minimize the dissolution of lead or copper into the water while limiting the tendency of the water to form scale.

6 Claims, 2 Drawing Sheets

METHOD FOR AUTOMATIC CONTROL OF CORROSION IN A WATER DISTRIBUTION SYSTEM

BACKGROUND OF THE INVENTION

The present invention relates to the field of corrosion control in municipal water distribution systems. The invention provides an automated method and apparatus for optimizing the control of corrosion in such systems.

Various indices exist for quantifying the corrosive tendencies of potable water. One such index is the Langelier index, defined as the deviation variable (pH-pHs), where pH is the measured pH of the water and pHs is the pH of saturation, i.e. the pH at which $CaCO_3$ will precipitate out of solution. The Langelier index is useful in predicting the scaling or corrosive tendencies of potable water in low-velocity flow bulk systems such as lime softeners, filters, or reservoirs. The Langelier index can be calculated as a function of calcium hardness, total alkalinity, pH, total dissolved solids, and temperature.

If a sample of water has a negative Langelier index, the water will dissolve $CaCO_3$, and will likely dissolve steel, lead, and copper in the presence of oxygen. If the sample has a positive Langelier index, the water will tend to form scale ($CaCO_3$). A Langelier index of zero indicates that the water is neither corrosive nor scale-forming.

Another index of corrosive effect is the stability index (SI), also known as the Ryznar index. The stability index, defined as SI=2pHs-pH, indicates a corrosive solution when the index exceeds 6.0, and indicates a scale-forming solution when the index is less than 6.0. The Ryznar index is empirical, and applies only to flowing systems, where the environment at the pipe wall is quite different from that of bulk water. If corrosion is occurring, oxidation reduction reactions create different conditions at the cathode and anode from those in flowing water. If suspended solids are present, the velocity of flow has an important effect on potential deposit formation from sedimentation that will influence the aqueous environment wetting the pipe wall. In general, the Langelier index is most useful in bulk systems and the Ryznar index is most useful in flowing systems where the velocity of the water is greater than 2 ft/sec, or sufficient to prevent sedimentation.

Legislation governing drinking water sets standards for levels of contaminants. In particular, regulations limit the amount of lead and copper in drinking water. The lead and copper rule establishes maximum contaminant levels at 15 micrograms per liter for lead, and 1300 micrograms per liter for copper. The U.S. Environmental Protection Agency has identified several treatment technologies that represent the best available technology for removing lead and copper, including coagulation/filtration, ion exchange, lime softening, and reverse osmosis.

The rules regarding levels of lead and copper are enforced by taking a plurality of water samples, and measuring their lead and copper contents. A high level of lead or copper indicates a corrosive tendency. The obvious response to a high level of lead or copper is to make the water less corrosive. But making the water less corrosive also tends to make the water more likely to form scale, which may clog the pipes. Thus, one needs to set a corrosion index which represents a balance between considerations of minimizing corrosion, while also preventing formation of scale.

The present invention provides an automated method and apparatus for determining a proper target value for the pH of water in a municipal distribution system, and automatically controlling the pH of the water, so as to facilitate compliance with drinking water regulations.

SUMMARY OF THE INVENTION

According to the method of the present invention, one first determines a desired value of an index of corrosion for water in the distribution system. This index may be the Langelier index (LI) or some other index. Next, one determines a desired value of the level of total solids for water in the system, and assigns a value to a parameter A in accordance with the selected value. Next, one repeats the preceding step with regard to a desired value of calcium hardness (resulting in the assignment of a value to a parameter C), and of total alkalinity (resulting in the assignment of a value to a parameter D). One measures the temperature of the water in the system, and assigns a value to a parameter B based on the measured value of temperature. In the preferred embodiment, one also measures the total alkalinity.

Having determined the above-described parameters, one then computes a target pH for water in the system, according to the following equation:

$$pH=LI+(9.3+A+B)-(C+D)$$

One then measures the actual pH of the water in the system. If the measured pH deviates above the target pH, the system automatically injects $CO_2$ into the system, at a rate proportional to the deviation, so as to bring the actual pH towards the target. If the total alkalinity is less than the target total alkalinity, then the rate of addition of lime is similarly increased.

The measurements of the temperature of the water, and of its pH, and of total alkalinity, are performed automatically and at periodic intervals, and the calculations of the target pH and target total alkalinity are repeated for each set of measurements. The system then automatically responds by injecting substances into the water, as necessary to maintain the pH and total alkalinity as desired.

The present invention also includes an apparatus for performing the method described above.

The present invention therefore has the primary object of providing a method of controlling corrosion in a water distribution system.

The invention has the further object of providing a method of corrosion control, wherein the system automatically sets the pH of the water in the system according to measurements that are taken continuously.

The invention has the further object of providing a method of corrosion control for a water distribution system, wherein the operator can determine, in advance, a desired value of an index of corrosion.

The invention has the further object of providing apparatus for performing the method described above.

The invention has the further object of providing comprehensive control over the corrosion tendencies in a municipal water distribution system.

The invention has the further object of enabling operators of municipal water distribution systems to comply more easily with governmental regulations relating to concentrations of lead or copper.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
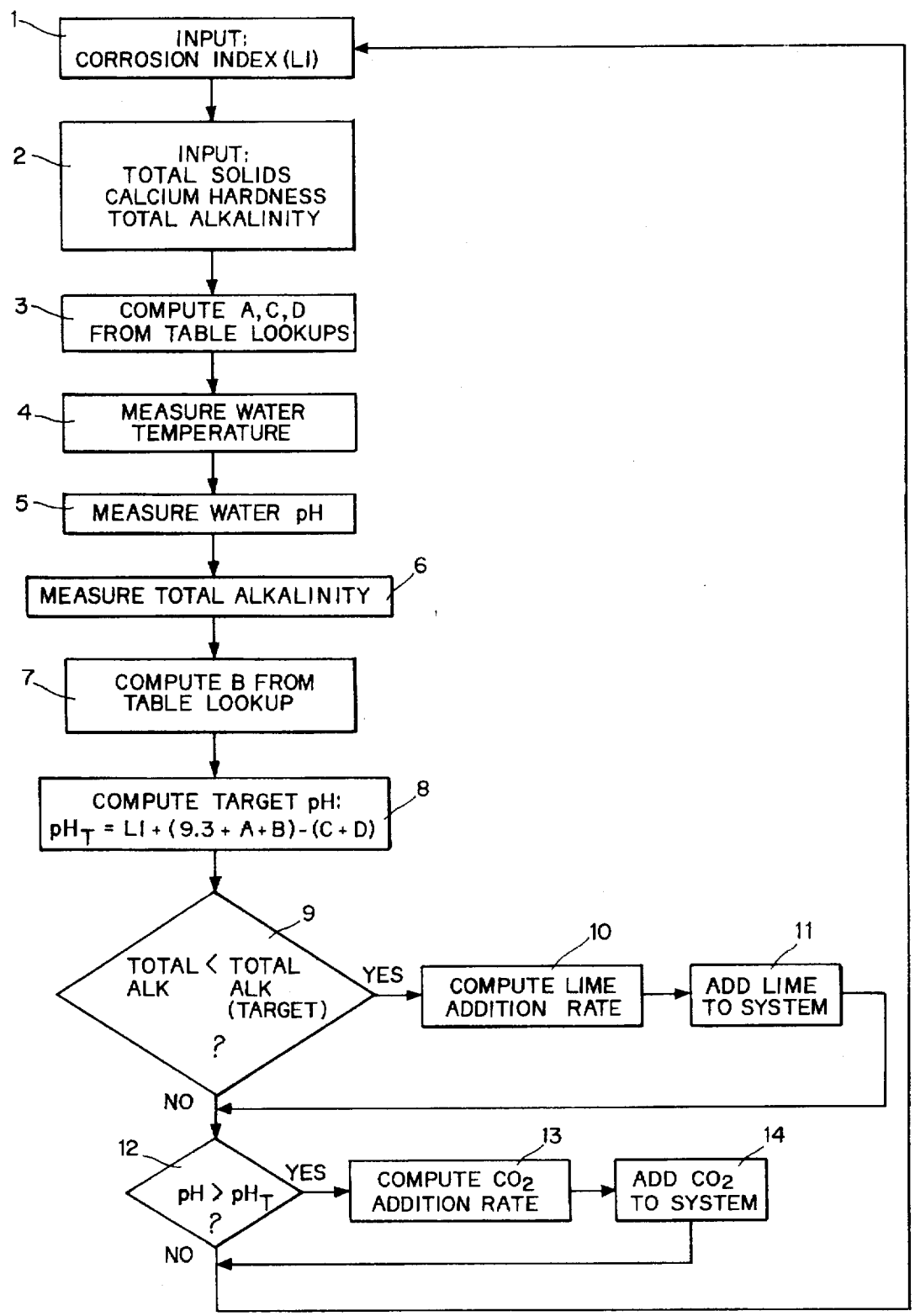
FIG. 1 provides a flow chart showing the major steps of the method of the present invention.

FIG. 1 provides a flow chart showing the major steps of the method of the present invention. Blocks 1 and 2 represent data input steps. A programmed computer, or programmable logic controller, or equivalent device which performs the same method, obtains desired values for a corrosion index LI (block 1), and for total solids, calcium hardness, and total alkalinity (block 2). The corrosion index is preferably the Langelier index, but other indices of corrosion could be used instead. "Total solids" is defined as the weight of total dissolved solids of any kind, in parts per million, when the water sample is evaporated to dryness. "Calcium hardness" is defined as the carbonate alkalinity, which is the weight of $CaCO_3$, in parts per million, remaining in the evaporation dish. "Total alkalinity" is defined as the sum of hydroxide alkalinity, carbonate alkalinity, and bicarbonate alkalinity, also measured in parts per million.

The desired values for total solids, calcium hardness, total alkalinity, and the corrosion index, can be entered manually, using a computer keyboard, based on prior knowledge of the operator of the water distribution system. These values remain constant until changed by a further manual entry through the keyboard.

The desired value of the corrosion index depends on the properties desired by the operator of the system. For example, if the corrosion index is the Langelier index, and if the operator wants to make the water more corrosive, a negative value of the index is selected. The more negative the value of the index, the more corrosive the water will be. Conversely, a positive value is chosen if it is desired to make the water more scale-forming. A Langelier index of zero indicates that the water will be neither corrosive nor scale-forming.

Next, the values for total solids, calcium hardness, and total alkalinity are converted into parameters A, C, and D, respectively, by performing table lookups, as described below.

For total solids, one determines the value of A from the following table:

TABLE 1

| Total solids (ppm) | A |
| --- | --- |
| 0–400 | 0.1 |
| >400 | 0.2 |

Thus, if the desired value of total solids is between 0 and 400 ppm, then the value assigned to parameter A is 0.1. If the level of total solids exceeds 400 ppm, then the value assigned to A is 0.2. The latter technique of converting a measured value into a scaled parameter has been known in the prior art, and does not, taken alone, form part of the present invention.

For calcium hardness, one determines the value of C from the following table:

TABLE 2

| Calcium hardness (ppm $CaCO_3$) | C |
| --- | --- |
| 10 | 0.6 |
| 12 | 0.7 |
| 14 | 0.8 |
| 18 | 0.9 |
| 23 | 1.0 |
| 28 | 1.1 |
| 35 | 1.2 |
| 44 | 1.3 |
| 56 | 1.4 |
| 70 | 1.5 |
| 88 | 1.6 |
| 111 | 1.7 |
| 139 | 1.8 |
| 175 | 1.9 |
| 230 | 2.0 |
| 280 | 2.1 |
| 350 | 2.2 |
| 440 | 2.3 |
| 560 | 2.4 |
| 700 | 2.5 |
| 870 | 2.6 |
| 1050 | 2.7 |

For example, if the calcium hardness does not exceed 10 ppm, the value of C becomes 0.6. If the calcium hardness is greater than 10, but does not exceed 12, the value of C becomes 0.7, and so on.

For total alkalinity, one determines the value of D from the following table:

TABLE 3

| Total alkalinity (ppm $CaCO_3$) | D |
| --- | --- |
| 10 | 1.0 |
| 12 | 1.1 |
| 14 | 1.2 |
| 18 | 1.3 |
| 23 | 1.4 |
| 28 | 1.5 |
| 36 | 1.6 |
| 45 | 1.7 |
| 56 | 1.8 |
| 70 | 1.9 |
| 88 | 2.0 |
| 111 | 2.1 |
| 140 | 2.2 |
| 177 | 2.3 |
| 230 | 2.4 |
| 280 | 2.5 |
| 360 | 2.6 |
| 450 | 2.7 |
| 560 | 2.8 |
| 700 | 2.9 |
| 880 | 3.0 |

One determines the value of parameter D in the same way as described for the other parameters.

Block 3 represents the determination of parameters A, C, and D through the table lookups described above. Thus, in practice, the tables are stored in the computer, or programmable logic controller, for use by the program in performing the indicated steps.

Next, the system measures the temperature of the water, in block 4. The water temperature is converted to digital form, through an appropriate analog-to-digital converter, and the value is stored by the computer. A similar step is performed in block 5, wherein the system measures the pH of the water.

In block 6, the system measures the total alkalinity of the water. Equipment for measuring total alkalinity is commercially available from the Hach Company.

In block 7, the system computes parameter B, which is derived from the measured temperature. Parameter B is obtained from the following table:

TABLE 4

| Measured temperature (°F.) | B |
| --- | --- |
| <32 | 2.6 |
| 33–36 | 2.5 |
| 37–44 | 2.4 |
| 45–50 | 2.3 |
| 51–58 | 2.2 |
| 59–64 | 2.1 |
| 65–72 | 2.0 |
| 73–82 | 1.9 |
| 83–90 | 1.8 |
| 91–100 | 1.7 |
| 101–112 | 1.6 |
| 113–124 | 1.5 |
| 125–134 | 1.4 |
| 135–148 | 1.3 |
| 149–162 | 1.2 |
| 163–180 | 1.1 |

As before, the table is preferably stored in a computer memory, or equivalent device, so that the table lookup can be fully automated. Using the parameters derived above, the system can then compute the target pH (called $pH_T$), in block 8.

Test 9 then compares the measured total alkalinity with the target total alkalinity. The target total alkalinity is one of the parameters entered in block 2. If the measured total alkalinity is smaller than the target value, it is necessary to increase the amount of lime in the water. The rate of addition of lime is directly (and linearly) proportional to the difference between the actual and target values. In block 10, the system computes a rate of addition of lime, and in block 11, the system adds lime to the system, at the calculated rate. If the measured total alkalinity is very close to the target value, there may be a point at which no additional lime is needed, in which case the lime addition rate, computed in block 10, will be zero or nearly zero. Then, the result of block 10 will have the effect of closing a valve that supplies lime to the system.

In test 12, the system determines whether the measured pH is larger than the target value. If so, the system computes the rate of addition of $CO_2$, in block 13, and adds the $CO_2$ to the system, at the computed rate, in block 14. The latter process is comparable to the procedure described above with respect to the addition of lime.

In summary, lime is added to minimize the deviation of measured total alkalinity and target total alkalinity, and $CO_2$ is added to minimize the deviation of measured pH and target pH.

The system then returns to block 1, reads the inputs, and repeats the indicated steps. Note that the system could instead return to block 4. In the latter case, the inputs would be set only once, and it would be necessary to re-start the system when it is desired to change the inputs. Alternatively, the system can be programmed to return to block 1 after a predetermined number of iterations, wherein the system otherwise returns to block 4. All of these alternatives fall within the scope of the invention.

Figure 2:
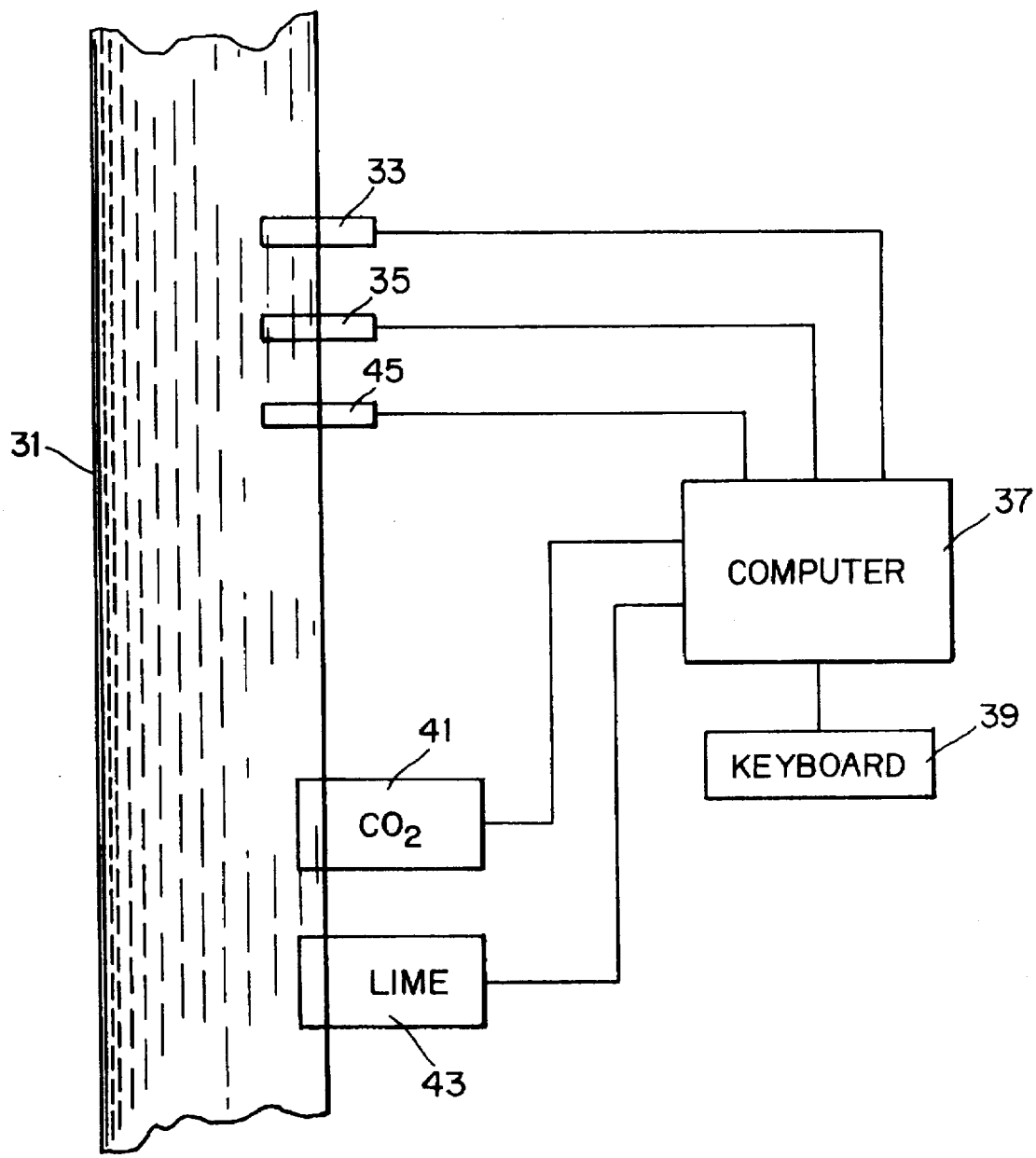
FIG. 2 provides a block diagram of the apparatus of the present invention.

FIG. 2 shows a block diagram of a system of the present invention. This figure shows water conduit 31, which represents a typical water vessel in the system to be controlled. Temperature sensor 33 and pH sensor 35 are positioned to contact water in conduit 31, and the outputs of the sensors are connected to computer or programmable logic controller 37. The computer is assumed to include analog-to-digital converters. It is also possible to provide such converters outside of the computer, or as part of one or both of the sensors.

Keyboard 39 provides means for transmitting data to the computer. As explained above, the operator uses the keyboard to select desired value for the corrosion index, and the values for total solids, calcium hardness, and total alkalinity. Control valve 41 injects $CO_2$ into the water in the system, according to an analog control signal from computer 37, when the measured pH is greater than the target value. Control valve 43 injects lime into the water, also according to an analog control signal from computer 37, when the total alkalinity of the water is less than the target value.

In operation, the user enters values manually into the computer, using the keyboard, and the computer executes the software symbolized by the flow chart of FIG. 1. In practice, the values of the parameters entered on the keyboard may not change at all for days, or longer. But the system enables the operator to change the values at any time, to suit particular needs. Also, the keyboard could be replaced by some other means of transmitting data to the computer.

In another embodiment, the invention can include automatic means for measuring some or all of the other parameters in the equation for target pH. Equipment that is commercially available from the Hach Company can directly measure parameters such as total alkalinity and calcium hardness, and can provide an electronic analog signal that can be connected to and read by a computer. In FIG. 2, element 45 represents a sensor that monitors one or more of these other parameters. In the case in which all of the parameters are monitored automatically, there is no need to enter their values on the keyboard. The only variable that would be entered by the operator is the desired Langelier index (or other corrosion index). In the preferred embodiment, the default value of the Langelier index is zero. That is, in the absence of an entry by the operator, the system will assume that the value of the Langelier index is zero, to minimize the deviation between measured pH and target pH.

Note also that element 45 is optional, and that the invention can be practiced without it, by simply entering the appropriate values through the keyboard. If element 45 is omitted, the operator of the system would simply measure the values of the parameters such as total alkalinity etc., using conventional methods, and would enter the results by keyboard.

The invention can be modified in various ways, as will become apparent to the reader skilled in the art. For example, mineral acids can be used to control pH instead of $CO_2$. Mineral bases can be used to control pH instead of lime. Other process variables can be used, instead of the parameters discussed above, although the use of other variables may require modification of the basic equation for target pH.

It is also possible to modify the program such that the system measures the flow velocity of the water. For example, if the flow velocity exceeds 2 ft/sec, the system could be programmed to use the Ryznar index as the index of corrosion, and to use the Langelier index for velocities less than or equal to 2 ft/sec.

The method and apparatus of the present invention are not limited to use in municipal water distribution systems, but can also be used in industrial processes, such as in scale control for cooling towers, heat exchangers, and in process equipment.

The modifications described above should be considered within the spirit and scope of the following claims.

What is claimed is:

1. A method of controlling corrosion and preventing scale formation in a municipal water distribution system, wherein the system includes water flowing through a conduit, the method comprising the steps of:
   a) determining a desired index of corrosion (LI) for water in the conduit which minimizes corrosion and prevents scale formation in said system,
   b) determining a desired level of total solids for water in the conduit, and assigning a value to a parameter A which is representative of the desired level of total solids,
   c) measuring temperature of the water in the conduit, and assigning a value to a parameter B which is representative of the measured temperature,
   d) determining a desired level of calcium hardness for water in the conduit, and assigning a value to a parameter C which is representative of the desired level of calcium hardness,
   e) determining a desired level of total alkalinity for water in the conduit, and assigning a value to a parameter D which is representative of the desired level of total alkalinity,
   f) computing a target pH for water in the conduit, according to the following equation:

$$pH=LI+(9.3+A+B)-(C+D)$$

g) measuring a pH of water in the conduit,
   h) measuring a value of total alkalinity of water in the conduit,
   i) varying the pH of water in the conduit so as to bring the measured pH closer to the target pH,
   j) varying the total alkalinity of water in the conduit so as to bring the measured total alkalinity closer to the desired level of total alkalinity, and
   k) periodically and automatically repeating steps (c), (f), and (g) through (j), to control corrosion and prevent scale formation in said system.

2. The method of claim 1, wherein step (b) comprises the step of establishing a plurality of ranges of possible values of the desired level of total solids, associating a value of parameter A with each of said plurality of ranges, and determining a range within which the desired level of total solids falls so as to determine a value of parameter A.

3. The method of claim 3, wherein step (c) comprises the step of establishing a plurality of ranges of possible values of the measured temperature, associating a value of parameter B with each of said plurality of ranges, and determining a range within which the measured temperature falls so as to determine a value of parameter B.

4. The method of claim 1, wherein step (d) comprises the step of establishing a plurality of ranges of possible values of the desired level of calcium hardness, associating a value of parameter C with each of said plurality of ranges, and determining a range within which the desired level of calcium hardness falls so as to determine a value of parameter C.

5. The method of claim 1, wherein step (e) comprises the step of establishing a plurality of ranges of possible values of the desired level of total alkalinity, associating a value of parameter D with each of said plurality of ranges, and determining a range within which the desired level of total alkalinity falls so as to determine a value of parameter D.

6. The method of claim 1, further comprising the steps of periodically repeating at least one of steps (a), (b), (d), and (e).

* * * * *